United States Patent
Roses

(10) Patent No.: US 7,357,754 B2
(45) Date of Patent: Apr. 15, 2008

(54) MECHANISM AND METHOD OF CONTROLLING AN AUTOMATIC SHIFTING POWER TRANSMISSION TO EFFECT A FIRST GEAR LAUNCH

(75) Inventor: Victor M. Roses, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 207 days.

(21) Appl. No.: 11/188,168

(22) Filed: Jul. 22, 2005

(65) Prior Publication Data

US 2007/0021266 A1    Jan. 25, 2007

(51) Int. Cl.
    *F16H 61/00*    (2006.01)
(52) U.S. Cl. ...................................... 477/143
(58) Field of Classification Search ........... 477/180, 477/169, 168, 166, 174, 176, 121, 143, 155, 477/53; 192/3.26–3.27
See application file for complete search history.

(56) References Cited

U.S. PATENT DOCUMENTS

| | | | | |
|---|---|---|---|---|
| 4,548,101 A | * | 10/1985 | Akashi et al. ................. 74/720 |
| 4,644,826 A | * | 2/1987 | Kubo et al. .................... 477/95 |
| 4,850,251 A | * | 7/1989 | Kuwayama et al. ........ 477/114 |
| 5,800,308 A | * | 9/1998 | Tsutsui et al. .............. 477/116 |
| 6,077,188 A | * | 6/2000 | Futamura et al. ............. 477/65 |
| 6,125,316 A | * | 9/2000 | Sasaki et al. .................. 701/62 |
| 6,244,402 B1 | * | 6/2001 | Domian et al. ............. 192/3.51 |
| 6,508,739 B1 | * | 1/2003 | Bellinger ...................... 477/62 |
| 7,189,188 B2 | * | 3/2007 | Nobumoto et al. ......... 477/176 |
| 2002/0173404 A1 | * | 11/2002 | Takatori et al. ............... 477/53 |
| 2004/0229728 A1 | * | 11/2004 | Oshima et al. ............. 477/176 |

* cited by examiner

*Primary Examiner*—Dirk Wright

(57) ABSTRACT

The present invention provides a mechanism and method of launching a vehicle using a conventional automatic shifting power transmission. By slipping a first gear reaction clutch during a launch, an efficient hydrodynamic fluid drive with a low stall speed may be used with negligible impact on launch performance. The reduced stall speed characteristic of the hydrodynamic drive may provide improved efficiency in other vehicle operating regions.

18 Claims, 2 Drawing Sheets

MECHANISM AND METHOD OF CONTROLLING AN AUTOMATIC SHIFTING POWER TRANSMISSION TO EFFECT A FIRST GEAR LAUNCH

TECHNICAL FIELD

The present invention relates to a mechanism and method of controlling an automatic shifting power transmission.

BACKGROUND OF THE INVENTION

In automatic shifting power transmissions, gear ratio changes are effected by selectively connecting members of planetary gear sets. This is accomplished by selectively engaging torque-transmitting devices such as brakes or clutches. For each gear ratio change, there is a corresponding sequence of off-going clutch disengagement and on-coming clutch engagement. By providing a regulated fluid pressure gain to the clutches, the smooth engagement and disengagement of the clutches may be accomplished.

Additionally, a majority of automatic shifting power transmissions employ a hydrodynamic fluid drive, such as a torque converter or a fluid coupling, between the power source (engine) and a multi-speed gear configuration, such as the planetary gear arrangement discussed above. This hydrodynamic fluid drive will allow the vehicle to come to rest without stalling the engine and will provide a measure of isolation preventing the torsional vibrations, caused by the firing events of the engine, from being transmitted though the powertrain.

A torque converter is a specialized form of fluid coupling that provides a torque multiplier between the engine and gearing to improve the launch performance of the vehicle. The torque ratio of the torque converter is generally in the range of 1.6 to 3.3 depending on the particular application.

As is well known, the hydrodynamic fluid drive is a slipping drive that has a high efficiency loss at vehicle launch. This loss decreases, but is still present, as the hydrodynamic fluid drive approaches a 1 to 1 speed ratio at high speed and low torque. A lock-up clutch is typically added to most automatic shifting power transmissions to effectively remove the hydrodynamic fluid drive from the power path and thereby improve the overall efficiency of the transmission.

The stall speed of the hydrodynamic fluid drive is an important consideration for proper vehicle launch. The stall speed is the speed at which the hydrodynamic fluid drive will hold the engine speed and not allow further gain. The stall speed is usually chosen based on engine torque characteristic, vehicle weight, vehicle duty cycle, etc. A properly selected stall speed will allow the engine to spin to the peak torque range to affect a strong vehicle launch. The stall speed of the converter cannot be varied or tuned while in use, therefore, there may be certain trade-offs such as part throttle efficiency when selecting the stall speed.

Other considerations have been given to improving the overall efficiency of the transmission. For example, the use of a starting clutch in lieu of a torque converter has been suggested and in some instances utilized. The advent of electronic controls improves the operation of a starting clutch as a vehicle launch device. The clutch is, however, a rotating device with all of the complexities associated with such a device. The control needs considerable accuracy to insure consistent fill times and to compensate for variable fluid leaks at the rotating shaft seals. This requires accurate hydraulic flow volumes and pressure control over a wide range of operating requirements. The starting clutch fulfills the requirements of the hydrodynamic fluid drive. These include, for example, shift and launch quality, driveline isolation, mass, peak acceleration, and durability.

SUMMARY OF THE INVENTION

The present invention provides a mechanism and method of launching a vehicle using a conventional automatic shifting power transmission. By slipping a first gear reaction clutch during a launch maneuver, an efficient hydrodynamic fluid drive with a low stall speed may be used with negligible impact on launch performance. The high efficiency characteristic of the hydrodynamic fluid drive is effective to provide improved efficiency in other vehicle operating regions.

The invention also provides a mechanism that incorporates the use of an efficient hydrodynamic fluid drive device in series with an integrated friction launch within a transmission by using a first gear reaction clutch with enhanced slip capability to allow system tuning. The hydrodynamic fluid drive device provides a "tight" or "stiff" characteristic, which is well suited to the engine's part throttle requirements. At higher throttle conditions, slipping the reaction clutch in first gear creates a "looser" characteristic. In the drive idle operating condition, the first gear reaction clutch is disengaged to minimize fuel consumption at idle. In the second forward range and higher, the hydrodynamic fluid drive device and lock-up clutch with a damper provide the necessary isolation and slip.

Accordingly, the present invention provides a method of controlling an automatic shifting power transmission having a hydrodynamic fluid drive device and at least one reaction clutch disposed in series with the hydrodynamic fluid drive device. The method includes slipping the at least one reaction clutch corresponding to a first gear engagement to effect a first gear launch maneuver when engine load is at or above a predetermined value, and fully engaging the at least one reaction clutch corresponding to the first gear engagement when engine load is below the predetermined value.

The method may further include disengaging the first of the at least one reaction clutch corresponding to the first gear engagement when the automatic shifting power transmission is in either a drive or a neutral gear state and the engine is idling. The hydrodynamic fluid drive device may be a fluid coupling or a torque converter and may include a lock-up clutch. The lock-up clutch of the present invention may be an electronically controlled capacity clutch. Additionally, the method may include fully engaging another of the at least one reaction clutch corresponding to the appropriate gear engagement when the automatic shifting power transmission is in second gear or higher, and engaging a lock-up clutch disposed in parallel with respect to the hydrodynamic fluid drive device. The predetermined value may be approximately 50 KPa of manifold air pressure.

The present invention also provides an automatic shifting power transmission having a hydrodynamic fluid drive device and a reaction clutch in series relationship with the hydrodynamic fluid drive device, the reaction clutch being operable to slip during a first gear launch maneuver.

The hydrodynamic fluid drive device may be a fluid coupling or a torque converter and may include a lock-up clutch. The lock-up clutch of the present invention may be an electronically controlled capacity clutch.

The present invention also provides a method of controlling an automatic shifting power transmission including providing an efficient hydrodynamic fluid drive device and a first gear reaction clutch operable to slip during a first gear launch. The method of the present invention also includes slipping the first gear reaction clutch to effect the first gear launch maneuver when engine load is at or above a predetermined value and fully engaging first gear reaction clutch corresponding to the first gear engagement when engine load is below the predetermined value.

The method may further include disengaging the first gear reaction clutch when the automatic shifting power transmission is in either a drive or a neutral gear state and the engine is idling. The hydrodynamic fluid drive device may be a fluid coupling or a torque converter. The predetermined value may be approximately 50 KPa of manifold air pressure.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
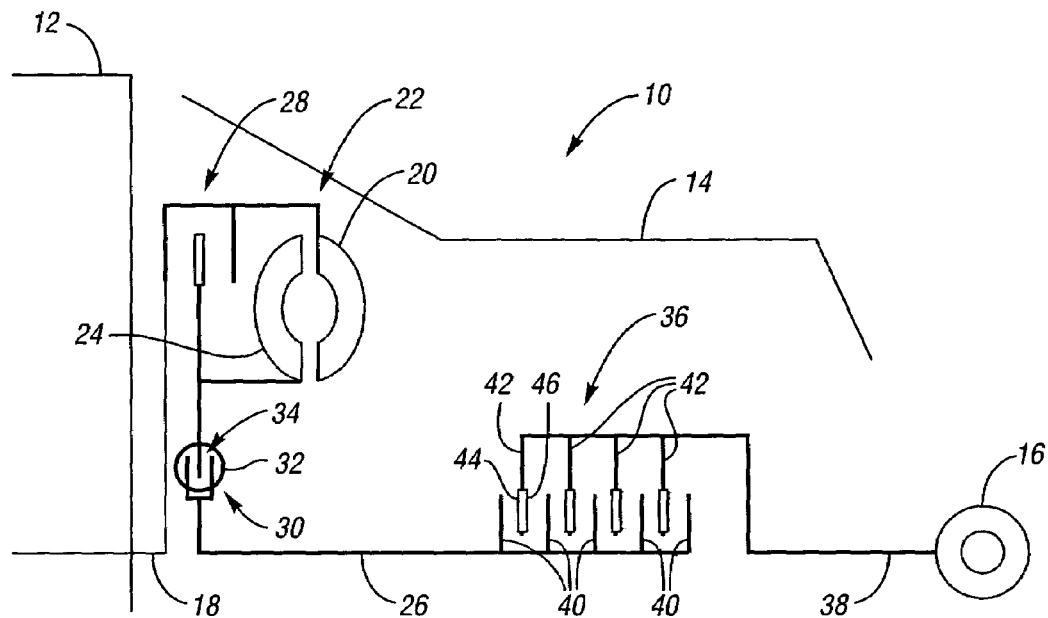
FIG. 1 is a schematic representation of a vehicular powertrain of this invention illustrating a neutral/drive gear state and engine idle mode of operation.

Referring to the drawings, wherein like characters represent the same or corresponding parts throughout the several views, there is seen in FIGS. 1 through 4 a powertrain 10. The powertrain 10 has a power source, such as a conventional internal combustion engine 12, a multi-speed automatic shifting power transmission 14, and a conventional final drive mechanism 16.

The engine 12 has an output shaft 18 with a pump section 20 of a hydrodynamic fluid drive device 22 rigidly mounted thereto. A turbine section 24 of the hydrodynamic fluid drive device 22 is mounted with respect to an input shaft 26 of the transmission 14. The hydrodynamic fluid drive device 22 may be either a fluid coupling or a torque converter, the operation of which are well known to those skilled in the art. Additionally, the present invention may include a lock-up clutch 28 in parallel with the hydrodynamic fluid drive device 22. The lock-up clutch 28 is operable to lock the input shaft 26 of the transmission 14 to the output shaft 18 of the engine 12 thereby allowing them to rotate in unison. By locking the input shaft 26 to the output shaft 18, the efficiency of the powertrain 10 will increase by reducing the slip losses of the hydrodynamic fluid drive device 22. In the preferred embodiment, the lock-up clutch 28 will be an electronically controlled capacity clutch. The electronically controlled capacity clutch will allow a slight amount of slip to occur between the input shaft 26 and the output shaft 18. This slip will decouple the input shaft 26 and the output shaft 18 and help to attenuate the transmission of torsional vibrations created by the firing events of the engine 12 to the remainder of the powertrain 10.

Additionally, the input shaft 26 may include a damper 30 in series with the lock-up clutch 28 and the hydrodynamic fluid drive device 22. The damper 30 operates to further isolate the torsional vibrations created by the firing events of the engine 12. The damper 30 may include a compliant member 32 such as a spring. The damper 30 may also include a lock-out clutch 34 operable to bypass the compliant member 32. This is useful when starting or stopping the engine 12 as the engine 12 may produce a resonance at low engine speeds. The design and operation of the damper 30 is well known to those skilled in the art of automatic shifting power transmissions 14.

Figure 2:
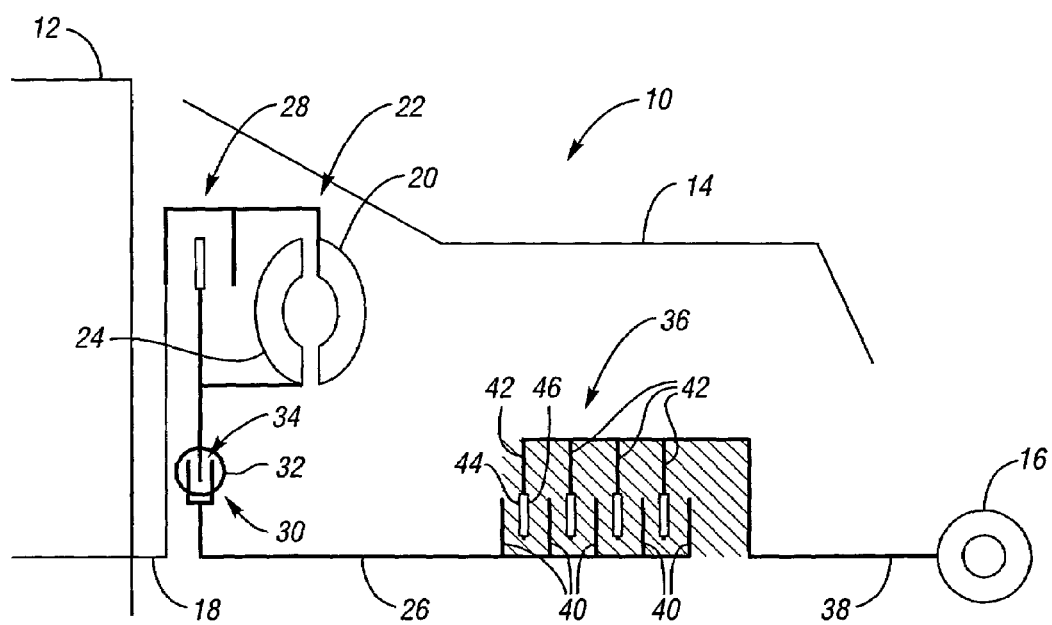
FIG. 2 is a schematic representation of the vehicular powertrain illustrating a first gear launch mode of operation with a slipping first gear reaction clutch.
Figure 3:
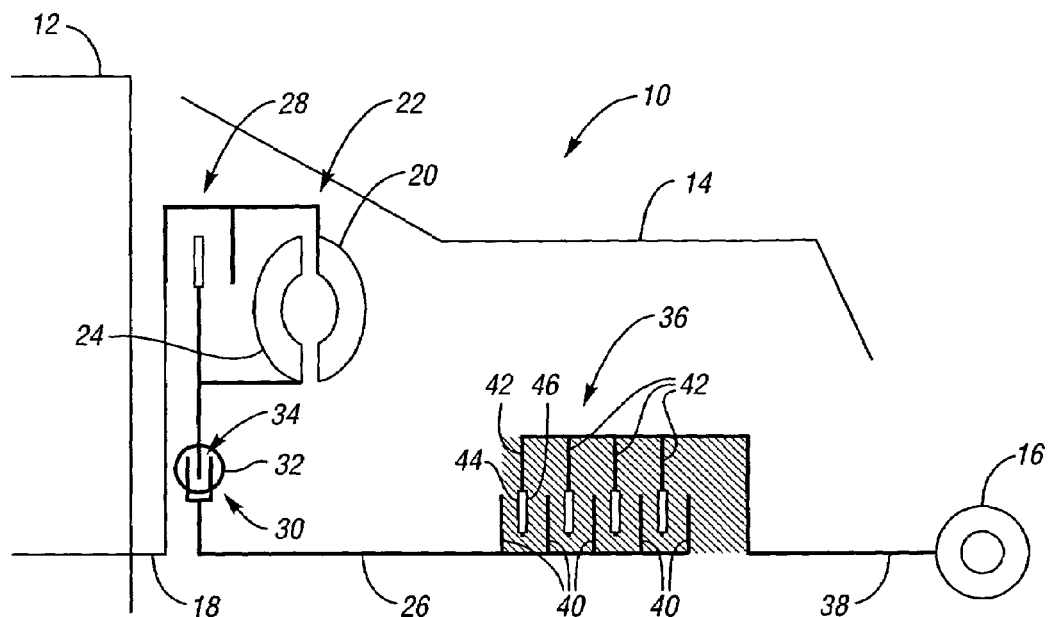
FIG. 3 is a schematic representation of the vehicular powertrain illustrating a first gear part throttle mode of operation with a fully engaged first gear reaction clutch.
Figure 4:
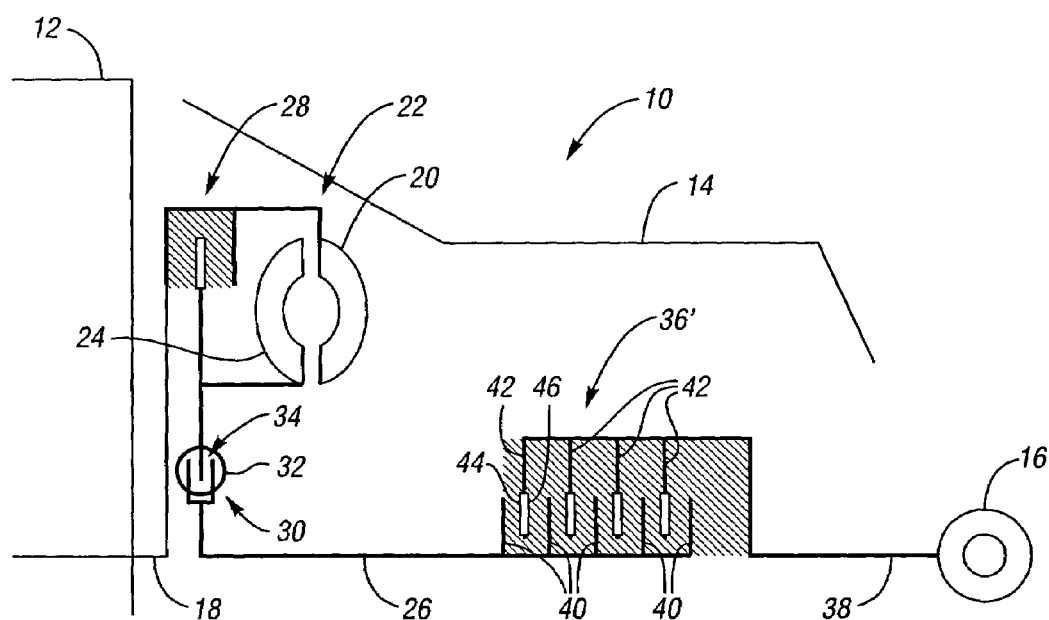
FIG. 4 is a schematic representation of the vehicular powertrain illustrating the second gear or higher mode of operation with a fully engaged first gear reaction clutch and an engaged lock-up clutch.

A first gear reaction clutch 36, shown in FIGS. 1-3, is selectively engageable and operable to selectively lock and unlock the input shaft 26 from a transmission output shaft 38. Additionally, there is shown in FIG. 4 a reaction clutch 36' that may or may not be the same clutch as the first gear reaction clutch 36 depending on which gear range is desired. The reaction clutches 36 and 36' are conventional fluid-operated multi-plate clutches. The reaction clutches 36 and 36' are selectively controlled in engaged and disengaged states by conventional electro-hydraulic mechanisms, not shown, which include a hydraulic valve arrangement and an electronic control unit (ECU) that incorporates a conventional programmable digital computer. The reaction clutches 36 and 36' are engaged and disengaged in accordance with performance and operating signals such as, for example, engine speed, vehicle speed, and engine torque to name a few. Those familiar with the art of transmission control will be familiar with the many features and functions that are available with electronic controls.

The reaction clutches 36 and 36' have a plurality of reaction plates 40 interleaved with a plurality of friction plates 42. Each of the friction plates 42 has a first friction-facing layer 44 and a second friction-facing layer 46 each disposed on opposite faces of the friction plate 42. The friction-facing layers 44 and 46 frictionally engage the reaction plates 40.

As is well known in the art of power transmissions, gear members of planetary gear sets, not shown, may be selectively engaged and disengaged to provide a speed ratio change between the input shaft 26 and the transmission output shaft 38. The operation of the planetary gear sets is well known to those skilled in the art. A final drive 16 is connected with respect to the transmission output shaft 38 and is operable to provide a final gear reduction to the drive wheels of the vehicle.

FIG. 1 is a schematic representation of the powertrain 10 illustrating the neutral/drive gear state and engine idle mode of operation. In this mode, the first gear reaction clutch 36 will remain disengaged, thereby decoupling the transmission output shaft 38 from the input shaft 26 thereby minimizing the reaction force imparted on the turbine section 24 of the hydrodynamic fluid drive device 22. As a result, the parasitic losses produced by slipping the hydrodynamic fluid drive device 22 will be minimized.

FIG. 2 is a schematic representation of the powertrain 10 illustrating the first gear launch mode of operation. In this mode, the first gear reaction clutch 36 is controlled in a slipping condition. By slipping the first gear reaction clutch 36, the engine 12 can spin to its peak torque band to allow a strong vehicle launch. In effect, slipping the first gear reaction clutch 36 artificially tunes the stall speed of the hydrodynamic fluid drive device 22 thereby enabling the usage of a highly efficient or "tight" hydrodynamic fluid drive device 22, which may provide efficiency gains in other areas of vehicle operation such as part throttle operation. Consideration should be paid to the selection of materials for the friction facing layers 44 and 46, as they will now be subject to a more severe duty cycle.

FIG. 3 is a schematic representation of the powertrain 10 illustrating the first gear, part throttle mode of operation. In this mode, the first gear reaction clutch 36 is closed or fully engaged. This will maintain a zero slip condition between the input shaft 26 and the transmission output shaft 38. Any slip will occur within the hydrodynamic fluid drive device 22. However, since the hydrodynamic fluid drive device 22 is highly efficient, the powertrain 10 will have a greater efficiency.

FIG. 4 is a schematic representation of the powertrain 10 illustrating the second gear and higher mode of operation. In this mode of operation, reaction clutch 36' is closed or fully engaged. This will maintain a zero slip condition between the input shaft 26 and the transmission output shaft 38. Any slip will occur within the hydrodynamic fluid drive device 22. However, the hydrodynamic fluid drive device 22 may include a lock-up clutch 28 that is operable to selectively lock the output shaft 18 with the input shaft 26 such that they rotate in sync. By employing a highly efficient hydrodynamic fluid drive device 22, the torque split across the lock-up clutch 28 and the hydrodynamic drive device 22 provides improved controllability of the lock-up clutch 28. In the preferred embodiment, the lock-up clutch 28 will be an electronically controlled capacity clutch. The electronically controlled capacity clutch will allow a slight amount of slip between the output shaft 18 and the input shaft 26 thereby decoupling the remainder of the powertrain 10 from the torsional vibrations produced by the firing events of the engine 12. The control of the electronically controlled capacity clutch will also improve with the utilization of an efficient hydrodynamic fluid drive device 22.

To affect a vehicle launch the first gear reaction clutch 36 should be placed in a slipping condition, as shown in FIG. 2, thereby allowing the engine 12 to rev into its torque band. The operating condition shown in FIG. 2 is effective at high engine load, such as values over 50 KPa of manifold air pressure (MAP). For low MAP values, the operating condition shown in FIG. 3 will be commanded. In this operating condition, the first gear reaction clutch 36 will be locked or fully engaged.

The benefits of the present invention may include enhanced fuel economy, enhanced driveability over a wide range of operating conditions, and improved lock-up clutch performance. Additionally the present invention may reduce cost, mass, and packaging requirements by eliminating the stator within the torque converter or enabling the use of a smaller torque converter in some applications.

While the best modes for carrying out the invention have been described in detail, those familiar with the art to which this invention relates will recognize various alternative designs and embodiments for practicing the invention within the scope of the appended claims.

The invention claimed is:

1. A method of controlling an automatic shifting power transmission having a hydrodynamic fluid drive device and at least one reaction clutch disposed in series with the hydrodynamic fluid drive device, the method comprising:
   slipping the at least one reaction clutch corresponding to a first gear engagement to effect a first gear launch maneuver when engine load is at or above a predetermined value; and
   fully engaging the at least one reaction clutch corresponding to said first gear engagement when engine load is below said predetermined value.

2. The method of controlling an automatic shifting power transmission of claim 1, further comprising:
   disengaging said first of the at least one reaction clutch corresponding to said first gear engagement when said automatic shifting power transmission is in either a drive or a neutral gear state and the engine is idling.

3. The method of controlling an engine mounted automatic shifting power transmission of claim 1, wherein the hydrodynamic fluid drive device is a fluid coupling.

4. The method of controlling an automatic shifting power transmission of claim 1, wherein the hydrodynamic fluid drive device is a torque converter.

5. The method of controlling an automatic shifting power transmission of claim 1, wherein the hydrodynamic fluid drive device has a lock-up clutch.

6. The method of controlling an automatic shifting power transmission of claim 5, wherein said lock-up clutch is an electronically controlled capacity clutch.

7. The method of controlling an automatic shifting power transmission of claim 1, further comprising:
   fully engaging another of the at least one reaction clutch corresponding to the appropriate gear engagement when said automatic shifting power transmission is in second gear or higher; and
   engaging a lock-up clutch disposed in parallel with respect to the hydrodynamic fluid drive device.

8. The method of controlling an automatic shifting power transmission of claim 1, wherein said predetermined value is approximately 50 KPa of manifold air pressure.

9. An automatic shifting power transmission comprising:
   a hydrodynamic fluid drive device;
   a reaction clutch in series relationship with said hydrodynamic fluid drive device, said reaction clutch being operable to slip during a first gear launch maneuver; and
   wherein said reaction clutch corresponds to a first gear engagement.

10. The automatic shifting power transmission of claim 9, wherein said hydrodynamic fluid drive device is a fluid coupling.

11. The automatic shifting power transmission of claim 9, wherein said hydrodynamic fluid drive device is a torque converter.

12. The automatic shifting power transmission of claim 9, further comprising:
   a lock-up clutch in parallel relationship with said hydrodynamic fluid drive device.

13. The automatic shifting power transmission of claim 12, wherein said lock-up clutch is an electronically controlled capacity clutch.

14. A method of controlling an automatic shifting power transmission comprising:
   providing an hydrodynamic fluid drive device;
   providing a first gear reaction clutch operable to slip during a first gear launch;
   slipping said first gear reaction clutch to effect said first gear launch maneuver when engine load is at or above a predetermined value; and
   fully engaging said first gear reaction clutch corresponding to said first gear engagement when engine load is below said predetermined value.

15. The method of controlling an automatic shifting power transmission of claim 14, further comprising:
    disengaging said first gear reaction clutch when the automatic shifting power transmission is in either a drive or a neutral gear state and the engine is idling.

16. The method of controlling an automatic shifting power transmission of claim 14, wherein said hydrodynamic fluid drive device is a fluid coupling.

17. The method of controlling an automatic shifting power transmission of claim 14, wherein said hydrodynamic fluid drive device is a torque converter.

18. The method of controlling an automatic shifting power transmission of claim 14, wherein said predetermined value is approximately 50 KPa of manifold air pressure.

\* \* \* \* \*